(12) United States Patent
Haugh

(10) Patent No.: US 7,480,798 B2
(45) Date of Patent: Jan. 20, 2009

(54) SYSTEM AND METHOD FOR REPRESENTING MULTIPLE SECURITY GROUPS AS A SINGLE DATA OBJECT

(75) Inventor: Julianne Frances Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 10/455,165

(22) Filed: Jun. 5, 2003

(65) Prior Publication Data

US 2005/0021952 A1   Jan. 27, 2005

(51) Int. Cl.
*H04L 9/00*   (2006.01)
*G06F 7/04*   (2006.01)
*G06F 15/16*  (2006.01)

(52) U.S. Cl. ............... 713/166; 726/27; 726/17; 709/201

(58) Field of Classification Search ........ 713/166; 726/27, 17; 709/9
See application file for complete search history.

(56) References Cited

U.S. PATENT DOCUMENTS

| | | | | |
|---|---|---|---|---|
| 4,525,780 A | * | 6/1985 | Bratt et al. ............... | 711/163 |
| 5,129,083 A | * | 7/1992 | Cutler et al. ............. | 707/103 R |
| 5,173,939 A | * | 12/1992 | Abadi et al. ............... | 707/9 |
| 5,263,157 A | * | 11/1993 | Janis ........................ | 707/9 |
| 5,315,657 A | * | 5/1994 | Abadi et al. ............... | 726/4 |
| 5,335,346 A | * | 8/1994 | Fabbio ...................... | 711/163 |
| 5,454,039 A | * | 9/1995 | Coppersmith et al. ..... | 380/28 |
| 5,454,101 A | * | 9/1995 | Mackay et al. ............. | 707/3 |
| 5,768,519 A | * | 6/1998 | Swift et al. ............... | 709/223 |
| 5,787,427 A | * | 7/1998 | Benantar et al. ........... | 707/9 |
| 5,797,128 A | * | 8/1998 | Birnbaum .................. | 707/5 |
| 5,878,415 A | * | 3/1999 | Olds ......................... | 707/9 |
| 6,023,765 A | * | 2/2000 | Kuhn ........................ | 726/4 |
| 6,044,466 A | * | 3/2000 | Anand et al. .............. | 726/1 |

(Continued)

FOREIGN PATENT DOCUMENTS

EP    0913966 A2    5/1999

*Primary Examiner*—Emmanuel L Moise
*Assistant Examiner*—Techane J Gergiso
(74) *Attorney, Agent, or Firm*—Duke W. Yee; Diana L. Roberts-Gerhardt; Theodore D. Fay, III

(57) ABSTRACT

A system and method for representing multiple security groups as a single data object are provided. With the system and method, a complex group object is created that consists of a group set value and a mask value. The complex group object represents a plurality of groups by the group set value. The mask value is used to apply to group identifiers received during an authentication process to generate a value that is compared against the group set value to determine if the group identifiers are part of the complex group. For example, in a first step of authorization processing, the group identifier received in an authorization request is bit-wise AND'd with the mask value for the complex group data object. In a second step, the masked group identifier from the received request is compared to the group set value of the complex group object. Such comparison may take the form of masking the group set value and comparing the masked group set value to the masked group identifier from the received request, for example. If the two values match, then access is granted. If the two values do not match, then access is denied.

4 Claims, 4 Drawing Sheets

U.S. PATENT DOCUMENTS

| | | | |
|---|---|---|---|
| 6,125,408 A * | 9/2000 | McGee et al. | 710/8 |
| 6,202,066 B1 * | 3/2001 | Barkley et al. | 707/9 |
| 6,237,036 B1 * | 5/2001 | Ueno et al. | 709/225 |
| 6,408,336 B1 * | 6/2002 | Schneider et al. | 709/229 |
| 6,412,070 B1 * | 6/2002 | Van Dyke et al. | 726/17 |
| 6,457,130 B2 * | 9/2002 | Hitz et al. | 726/27 |
| 6,487,659 B1 * | 11/2002 | Kigo et al. | 713/168 |
| 6,532,505 B1 * | 3/2003 | Stracovsky et al. | 710/63 |
| 6,581,060 B1 * | 6/2003 | Choy | 707/9 |
| 6,625,603 B1 * | 9/2003 | Garg et al. | 707/9 |
| 6,651,096 B1 * | 11/2003 | Gai et al. | 709/223 |
| 6,678,828 B1 * | 1/2004 | Pham et al. | 726/2 |
| 6,785,728 B1 * | 8/2004 | Schneider et al. | 709/229 |
| 6,910,041 B2 * | 6/2005 | Exton et al. | 707/9 |
| 6,944,777 B1 * | 9/2005 | Belani et al. | 713/150 |
| 6,950,818 B2 * | 9/2005 | Dennis et al. | 707/3 |
| 7,107,538 B1 * | 9/2006 | Hinckley et al. | 715/743 |
| 7,152,046 B2 * | 12/2006 | Wang et al. | 705/51 |
| 2002/0099952 A1 * | 7/2002 | Lambert et al. | 713/200 |
| 2002/0162030 A1 * | 10/2002 | Brezak et al. | 713/202 |
| 2003/0088786 A1 * | 5/2003 | Moran et al. | 713/201 |
| 2004/0088563 A1 * | 5/2004 | Hogan et al. | 713/200 |
| 2004/0103096 A1 * | 5/2004 | Larsen | 707/9 |
| 2004/0243835 A1 * | 12/2004 | Terzis et al. | 713/200 |
| 2005/0257244 A1 * | 11/2005 | Joly et al. | 726/1 |
| 2006/0059567 A1 * | 3/2006 | Bird et al. | 726/27 |
| 2006/0117058 A1 * | 6/2006 | Smith et al. | 707/102 |

* cited by examiner

SYSTEM AND METHOD FOR REPRESENTING MULTIPLE SECURITY GROUPS AS A SINGLE DATA OBJECT

BACKGROUND OF THE INVENTION

1. Technical Field

The present invention is directed to a system and method for representing multiple security groups as a single data object. More specifically, the present invention is directed to a mechanism for representing and authenticating a plurality of security groups using a complex group value and a mask value.

2. Description of Related Art

In most large scale computing systems users and resources are typically arranged in groups in order to manage system security. For example, access control lists may be provided for managing accesses to resources by other resources and/or users of the computing system. An access control list is a set of data associated with a file, directory or other resource that defines the permissions that users, groups, processes or devices have for accessing it. For example, a group may be established for "administrators" and a user's identifier may be added to this group to designate the user as an "administrator" If a resource's access control list indicates that only "administrators" may be provided with access to the resource, then the user whose identifier is part of the "administrators" group will be able to access this resource.

One problem with many large computer systems is the proliferation of group identifiers in the computer system. When a user or resource requests access to another resource, the authentication must traverse, on average, one half of the entire list of groups to identify the group associated with the user or resource requesting access and then determine if access permission is present. That is, as the number of groups used in the computer system increases, the time required to perform authorization processing increases. This causes a decrease in the performance of the computer system.

Thus, it would be beneficial to have a system and method for representing groups of users/resources in a manner that does not require traversal of a large list of group identifiers to determine if access to a resource is permitted.

SUMMARY OF THE INVENTION

The present invention provides a system and method for representing multiple security groups as a single data object. With the system and method of the present invention, a complex group object is created that consists of a group set value and a mask value. The complex group object represents a plurality of groups by the group set value. The mask value is used to apply to group identifiers received during an authentication process to generate a value that is compared against the group set value to determine if the group identifiers are part of the complex group For example, the authorization processing of the present invention is a two step operation. In a first step of the processing, the group identifier received in an authorization request is bit-wise AND'd with the mask value for the complex group. In a second step, the masked group identifier from the received request is compared to the group set value of the complex group object. Such comparison may take the form of masking the group set value and comparing the masked group set value to the masked group identifier from the received request, for example. If the two values match, then access is granted. If the two values do not match, then access is denied.

Thus, with the present invention the same group set value may be used to represent a plurality of different groups. Resources may be provided with different mask values in order to identify which groups in the group set value are authorized to access the associated resource. As a result, a plurality of resources may be provided with complex group objects that all have the same group set value but may have different mask values for their specific purposes.

With the present invention, the amount of processing necessary to authorize access to a given resource remains the same regardless of the number of groups. Additional groups may be added by increasing the number of bits in the group set value and mask value. However, the authorization process will always consist of the two step process of masking the received group identifier and comparing the masked group identifier to the group set value of the complex group object for the resource. In other words, the size of the "group" structure maintained by the computing system does not appreciably affect the performance of the authorization process of the present invention.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a mechanism for authenticating resource access requests based on a single data object representing a plurality of groups of users/resources. The present invention is preferably implemented in a distributed data processing environment in which there are a plurality of groups of user/resources that may access resources of the distributed data processing environment via one or more networks. However, the present invention may also be implemented in a stand-alone computing device. Therefore, the following diagrams in FIGS. 1-3 are provided in order to give a context for the description of the operation of the present invention following thereafter.

Figure 1:
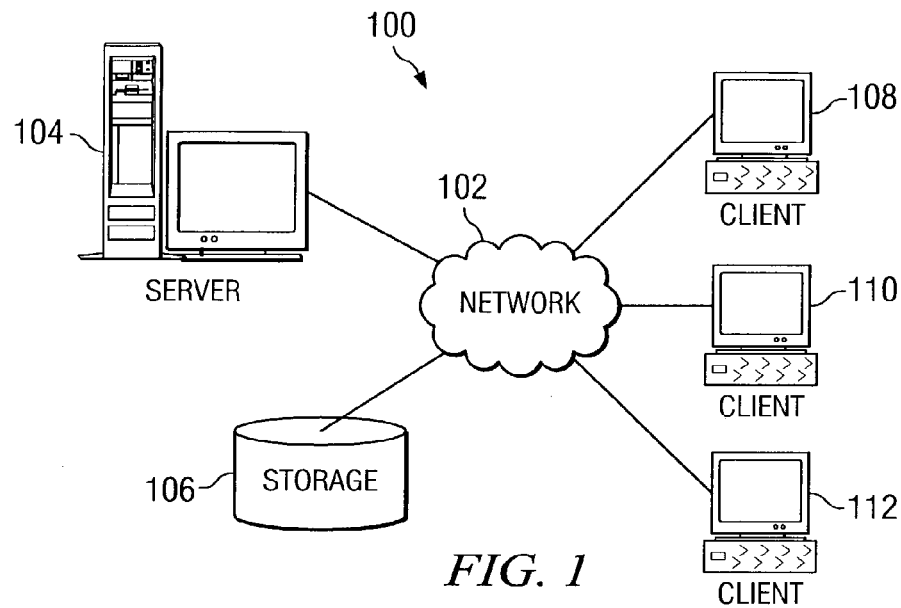
FIG. 1 is an exemplary diagram of a distributed data processing environment in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
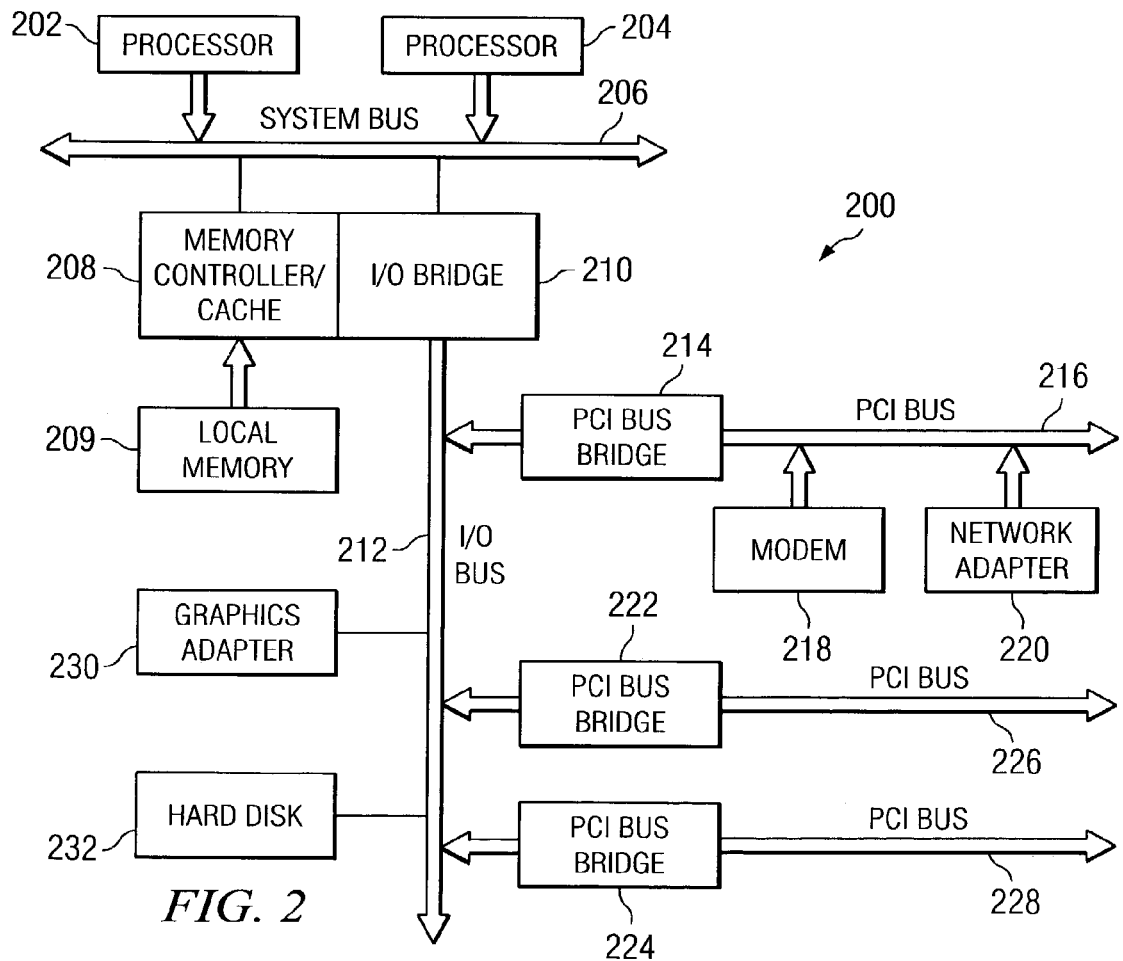
FIG. 2 is an exemplary diagram of a server computing device in which the present invention may be implemented.
Figure 3:
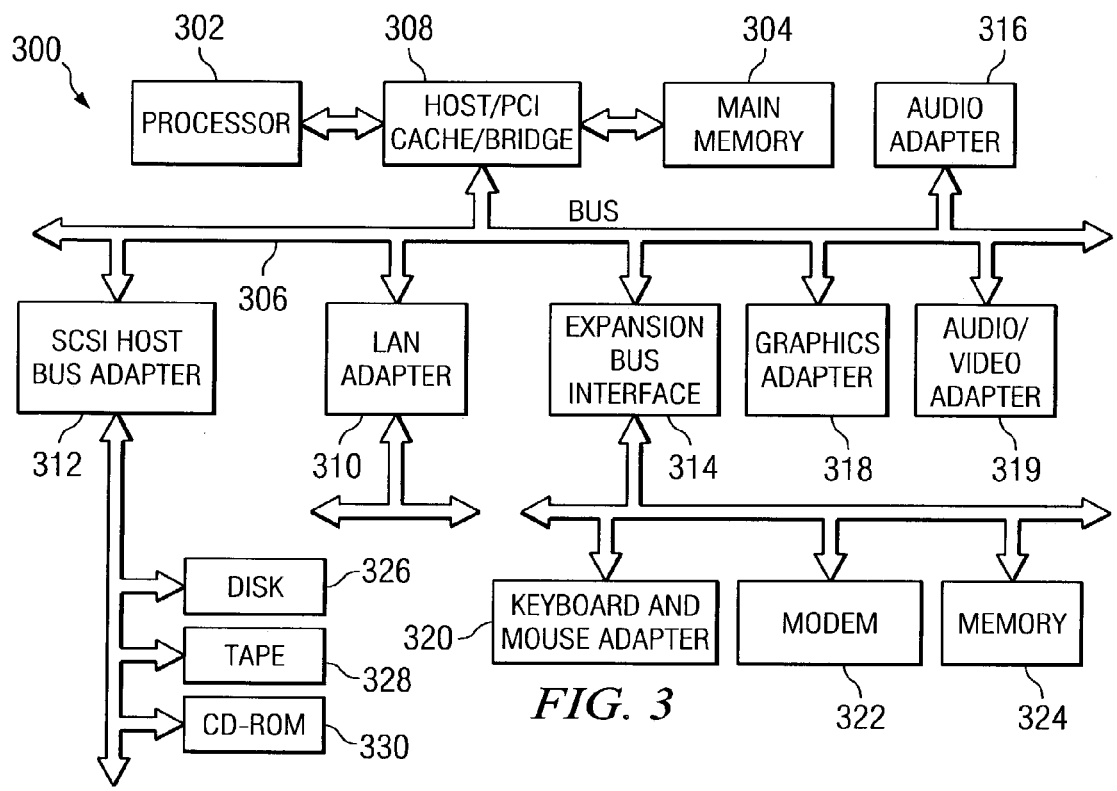
FIG. 3 is an exemplary diagram of a client or stand-alone computing device in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pseries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 may be a client computer, such as those shown in FIG. 1, or may be a stand-alone computing device. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As previously mentioned, the present invention provides a system and method for representing multiple security groups as a single data object. This single data object is referred to herein as a "complex group" data object or C-Group object. The C-Group object is created as a data object that includes a group set value and a mask value. The group set value represents a plurality of groups and the mask value represents the subset of the group set that is of particular importance to an associated resource.

For example, in a distributed data processing environment, there may be hundreds of groups of users/resources that are all represented by the group set value. For example, a business may be segregated into regional locations, departments, work groups, etc. Each regional location may have its own supergroup, each department of each regional location may have their own sub-group, each work group within each department of each regional location may have their own sub-subgroup, and so on. Each of these groups may be represented by a single group set value. Alternatively, a small number of group set values may be used to identify various portions of these groups.

The mask value is used to mask out the bits of a group identifier that are not necessary for determining whether a requester is authorized to access an associated resource. That is, for example, a group identifier may include a regional identifier, a department identifier, and a work group identifier. If a resource is to be available to all users/resources at a particular regional office, then the mask for the resource may mask out all of the bits associated with the department identifier and work group identifier. That is, the mask will allow all, or at least some, of the bits of the regional identifier to pass while the bits associated with department identifier and work group identifier are cleared.

As a concrete example, assume that the group identifier is 1010 0011 1001. The mask value discussed above may take the form 1111 0000 0000. This mask value indicates that access to the associated resource is not dependent upon department or work group but is based on whether the user/resource is affiliated with a particular regional office.

The mask value may be applied to the group identifier to obtain only those bits that are of importance to the authorization processing. That is, the mask value may be bitwise AND'd to the group identifier to obtain a masked group identifier associated with the requestor, i.e. the user/resource or process that submitted the access request. In the above example, bitwise ANDing the mask value with the group identifier results in a masked group identifier of 1010 0000 0000.

The resulting masked group identifier is compared to the group set value in the C-Group object associated with the resource. This comparison may involve, for example, masking the group set value with the associated mask value to obtain a masked group set value in a similar way as discussed above with regard to the group identifier of the requester. For example, assume that the group set value is 1010 1001 1000. By applying the mask value to the group set value, i.e. bitwise ANDing the mask value with the group set value, the following masked group set value results: 1010 0000 0000.

A comparison of the masked group identifier and the masked group set value is then made to determine if they match. If they do match, this means that the requester is part of a group represented by the group set value. As a result, since the C-Group object identifies those groups of users/resources that are authorized to access the resource, and the group identifier of the requester is part of one or more of the groups represented by the C-Group object, then access is granted to the resource.

Figure 4:
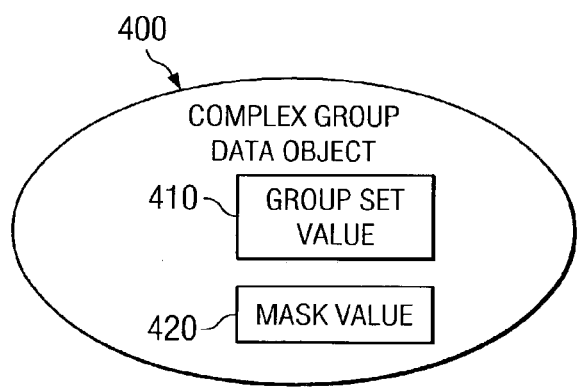
FIG. 4 is an exemplary diagram of a complex group data object in accordance with an embodiment of the present invention.

FIG. 4 is an exemplary diagram of a complex group data object in accordance with an embodiment of the present invention. As shown in FIG. 4, the complex group data object or C-Group object 400 includes a group set value 410 and a mask value 420. The group set value 410 represents a plurality of groups of users/resources of the data processing system in which the present invention is implemented. The same group set value 410 may be utilized in a plurality of different C-Group objects 400 within the same data processing system.

The mask value 420 provides a mechanism for identifying the portions of the group set value 410 that must be matched by a group identifier of a requestor in order for the authentication process to succeed. That is, the mask value 420 provides a customizability of the C-Group object 400 to a specific purpose. For example, two different resources may have C-Group objects that have the same group set value 410 but have different mask values 420. One mask value may be used to designate that only administrator level users are able to access the associated resource, while the other mask value may be used to designate that all users associated with a particular department may be given access to an associated resource.

As previously mentioned, once a C-Group object 400 has been created for a particular resource or group of resources, the C-Group object 400 is used by a computing device, such as a server or stand-alone computer, to perform an authentication process. This authentication process determines whether a requester for access to a particular resource is associated with a group to which access is granted for the particular resource.

Figure 5:
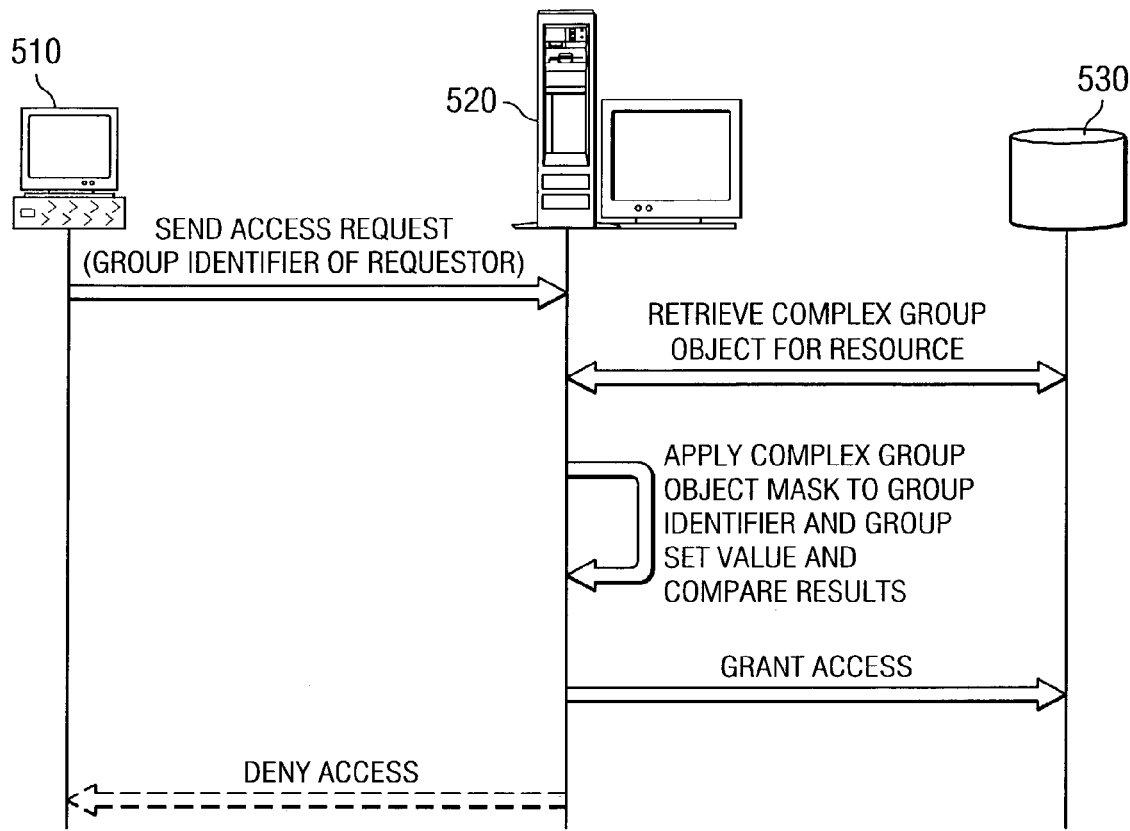
FIG. 5 is an exemplary diagram illustrating a data flow in accordance with an exemplary embodiment of the present invention.

FIG. 5 is an exemplary diagram illustrating a data flow in accordance with an exemplary embodiment of the present invention for using a C-Group object to authorize access to an associated resource. The particular exemplary operation shown in FIG. 5 is for a distributed data processing environment. It should be appreciated that with a stand-alone computing device, the processing discussed with regard to FIG. 5 may be performed entirely within the same computing device without departing from the spirit and scope of the present invention.

As shown in FIG. 5, A user/resource or process of a client device 510 may transmit an access request to a server 520. The access request will include an identifier of the resource for which access is sought and an identifier of the requester, i.e. the user/resource or process that generated the access request in the client device 510. This requester identifier is referred to as a group identifier because it identifies the group(s) to which the user/resource or process belongs in the distributed data processing system.

Upon receiving the access request from the client device 510, the server 520 retrieves a complex group data object for the resource designated in the access request from the storage device 530. The complex group data object, or C-Group object, includes a group set value and a mask value. The mask value is applied to the group identifier from the access request and to the group set value by, for example, bitwise ANDing the mask value with the group identifier and the group set value. The result is a masked group identifier and a masked group set value. The masked group identifier and the masked group set value are then compared to determine if there is a match. If so, access is granted to the resource. Otherwise, if there is not a match, then access is denied.

As previously mentioned, the group set value represents a plurality of groups. The mask values may be used to select from these plurality of groups, a subset of groups that may be provided access to a particular resource. The mask value and group set value may be implemented for a plurality of different group architectures including a hierarchical group architecture, a group category membership type architecture or a hybrid of the hierarchical and group category membership type architectures, for example. Examples of how these different architectures are facilitated by the group set value and mask value of the present invention are provided in FIG. 6.

Figure 6:
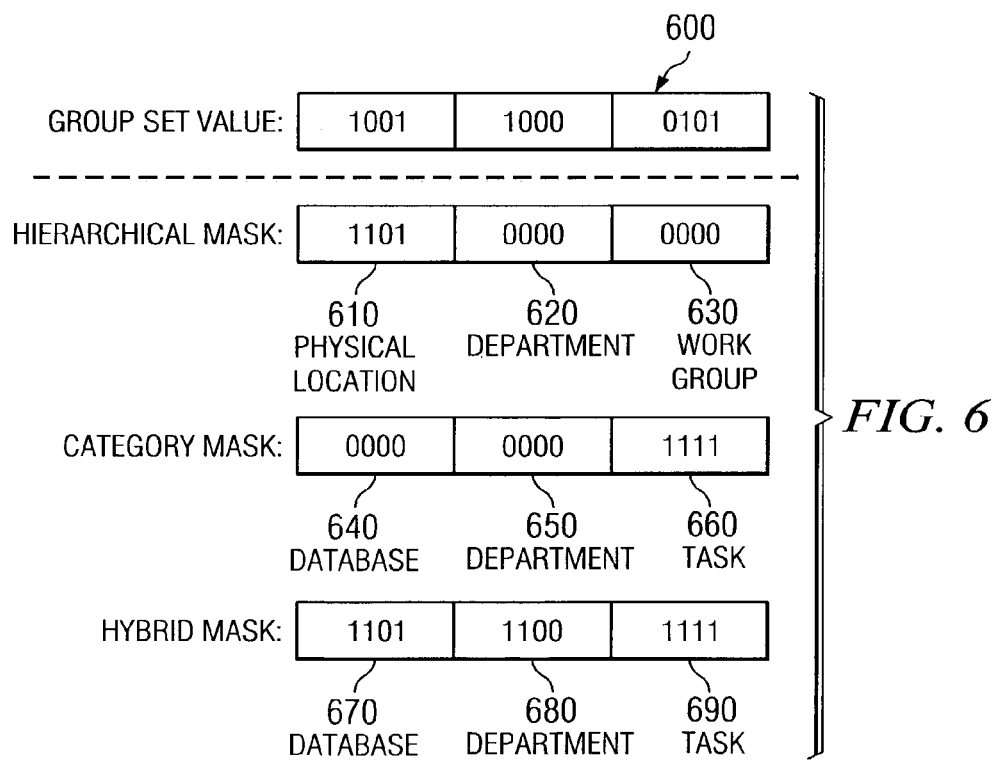
FIG. 6 is an exemplary diagram of a group set value and various mask values that may be used with embodiments of the present invention.

FIG. 6 is an exemplary diagram of a group set value and various mask values that may be used with embodiments of the present invention. As shown in FIG. 6, a group set value 600 may be provided in a complex group data object. This group set value 600 may mean different things based on the type of group architecture used by the distributed data processing system in which the present invention is implemented, as will be discussed hereafter. The mask value may be organized in a number of different ways depending on the architecture of the groups in a data processing system, also as discussed hereafter. In the particular example shown, the same group set value 600 will be used in each example architecture with different mask values being used to illustrate the differences in interpretation of the group set value based on the group architecture of the data processing system.

As shown in FIG. 6, there are basically three different group architectures in which the present invention is implemented: hierarchical, group category membership (or simply "category"), and a hybrid group architecture. The implementation of the present invention in each of these architectures is described hereafter.

In the case of hierarchical group membership, the group set value represents the "top level" hierarchical groups that are represented by the complex group data object. The mask value sets forth the particular hierarchical group(s) with which a requester must be associated in order to obtain access to a resource. This mask value organization may be represented as <hierarchy>/ALL where "<hierarchy> is a specific bit pattern within a field <n> bits in width. ALL is a string of "0" bits having a width of <size>-<n> bits where <size> is the width of the group set value in bits. In the depicted example, <size> is 12 bits, <n> is 8 bits, and the width of the ALL string is 4 bits.

In the particular example shown in FIG. 6, the hierarchical mask is broken up into strings of bits representing various levels of hierarchical structure to the particular data processing system. For example, an upper level of the hierarchy is represented by "physical location" 610 which identifies regional offices. A subset of the "physical location" 610 is "department" 620 and a subset of "department" is "work group" 630. Thus, with the hierarchical mask value shown in FIG. 6, various combinations of physical location, department and work group may be specified as being allowed to access a particular resource.

In the depicted example, the mask value is 1101 1100 0000. The physical location 610 and department 620 represent the <hierarchy> of the mask value and the work group 630 is the ALL string of 0 bits. Thus, the particular hierarchy bits of a requestor's group identifier, designated by the mask value in 610 and 620, must match the group set value 600.

As an example, assume that the requestor's group identifier is 1011 1011 1111. The hierarchical mask value in FIG. 6 indicates that the requester must be associated with one or more of the physical location(s) represented by the string of bits 610 and must be associated with one or more of the departments represented by the bit string 620. The particular work group with which the requester is associated is not material to determining whether the request is authorized in this particular example.

When the requestor's group identifier value is AND'd with the mask value, the result is 1001 1000 0000. When the hierarchical mask value is AND'd with the group set value, the result is 1001 1000 0000 and thus there is a match. Thus, the requester will be provided with access to the resource. On the other hand, if the requestor's group identifier were 1101 1011 1111, the result of the application of the mask would be 1101 1000 0000 and there would not be a match. Accordingly, the requester would not be provided with access to the resource.

In the case of group category membership architectures, or simply "category" architectures, the group set value may represent the "lower level" membership with the mask value representing the category or categories of users/resources with which a requester must be associated in order to obtain access to a resource. A mask value of this type may be represented as ALL/<category> where ALL is again a string of 0 bits. In this case, ALL has a width of <n> bit where <n> is the width of the mask value used to select the hierarchical portions of the group set value. The <category> portion is a specific bit pattern within a field having a width of <size>-<n> bits, where <size> is the width of the group set value in bits.

In the particular example shown in FIG. 6, the category mask is broken up into strings of bits representing particular physical locations 640, departments 650 and work groups 660. In the depicted example, <size> will again be 12 bits, <n> would be 8 bits since both portions 640 and 650 are used to represent the particular hierarchy, and <category> would be 4 bits. As shown, the hierarchy bits have been cleared in the category mask such that they are not material to determining whether an access request for the associated resource is authorized or not. All that is important to this authorization processing is the particular work group with which the requester is associated regardless of the particular physical location or department, i.e. the category of the requestor is all that is important.

In the depicted example, the only requesters that are allowed to access the particular resource are those associated with the work group represented by the work group portion 0101. Any other work groups such as 1101, 1000, 1111, or the like, will not be able to access the particular resource. However, if the category mask value were modified to be 0000 0000 1101, for example, then any work group whose work group portion of their group identifier had the form 01x1, where x is either a 0 or a 1, would be able to access the associated resource. Similarly, if the category mask value were modified to be 0000 0000 0101, then any work group whose work group portion of their group identifier had the form x1x1, where x is either 0 or 1, would be able to access the associated resource regardless of the particular physical location or department of the work group.

In the case of hybridized group architectures, the group set value is divided up into multiple bit fields. In the depicted example, the group set value is divided into a field 670 representing particular databases, a field 680 representing particular departments, and field 690 representing particular tasks. Each field may have their own width <i>, <j>, and <k>, for example. In the depicted example, each of <i>, <j> and <k> are 4 bits in width, however, in other implementations each of these widths may be different from one another. The dependency or independent nature of these fields on one another is implementation specific however any measure of dependency or independency may be represented by this hybrid architecture.

For example, as shown in FIG. 6, the hybrid mask has the value 1101 0000 1111. This mask value means that access to the associated resource is dependent upon the database and the particular task being performed. The particular department of the requester is not important to the authorization of the access to the resource. As a result, any requester whose group identifier has the following form 10x1 xxxx 0101 will be granted access to the resource, where x is either a 0 or a 1.

Thus, the present invention allows a plurality of groups of users/resources/processes to be represented by a single complex group data object having a group set value and a mask value. The processing of an authorization request involves applying the mask value of the complex group data object to both the group identifier of the requester and the group set value of the complex group data object to determine if there is a match. If so, authorization to access the resource is granted to the requestor. If there is no match, then the access is denied. Because the processing of applying the mask and determining a match is the only processing necessary to authenticate a request for access, the size of the group architecture of the particular data processing system does not appreciably affect the performance of the authentication process. All that is required to handle more complex group architectures is to provide additional bits in portions of the group set value and the mask value.

In addition, the present invention provides great flexibility in handling various group architectures. For example, the present invention may be used to define database subgroups such as "accounting", "marketing", "research", and database tasks such as "backup", "create", and the like. Group set values may then be defined in a mix and match fashion with regard to these various subgroups and database tasks.

For example, authorization to backup a database may require a group or complex group which allows access to the "backup" tool (which has the requirement that the requestor have membership in the "backup" group), as well as a group or complex group which allows access to the data (which has the requirement that the requester have membership in some group associated with the data). Expressed as groups and complex groups, a user would be required to have either membership in the traditional group "backup," or a complex group which had ALL/backup as its value (that is, a mask value of all leading zeros, except those bits which select the "backup" functionality). In addition, a user would also be required to have membership in a group or a complex group which allowed access to the specific data. For example, files owned by the group "database/headquarters/accounting" would require a traditional group with that specific value, a complex group which allowed access to all "database" (e.g., database/ALL) files, all "headquarter" files (e.g., ALL/headquarter/ALL), all "accounting files (e.g., ALL/ALL/accounting), or some other combination, such as database/ALL/accounting.

Figure 7:
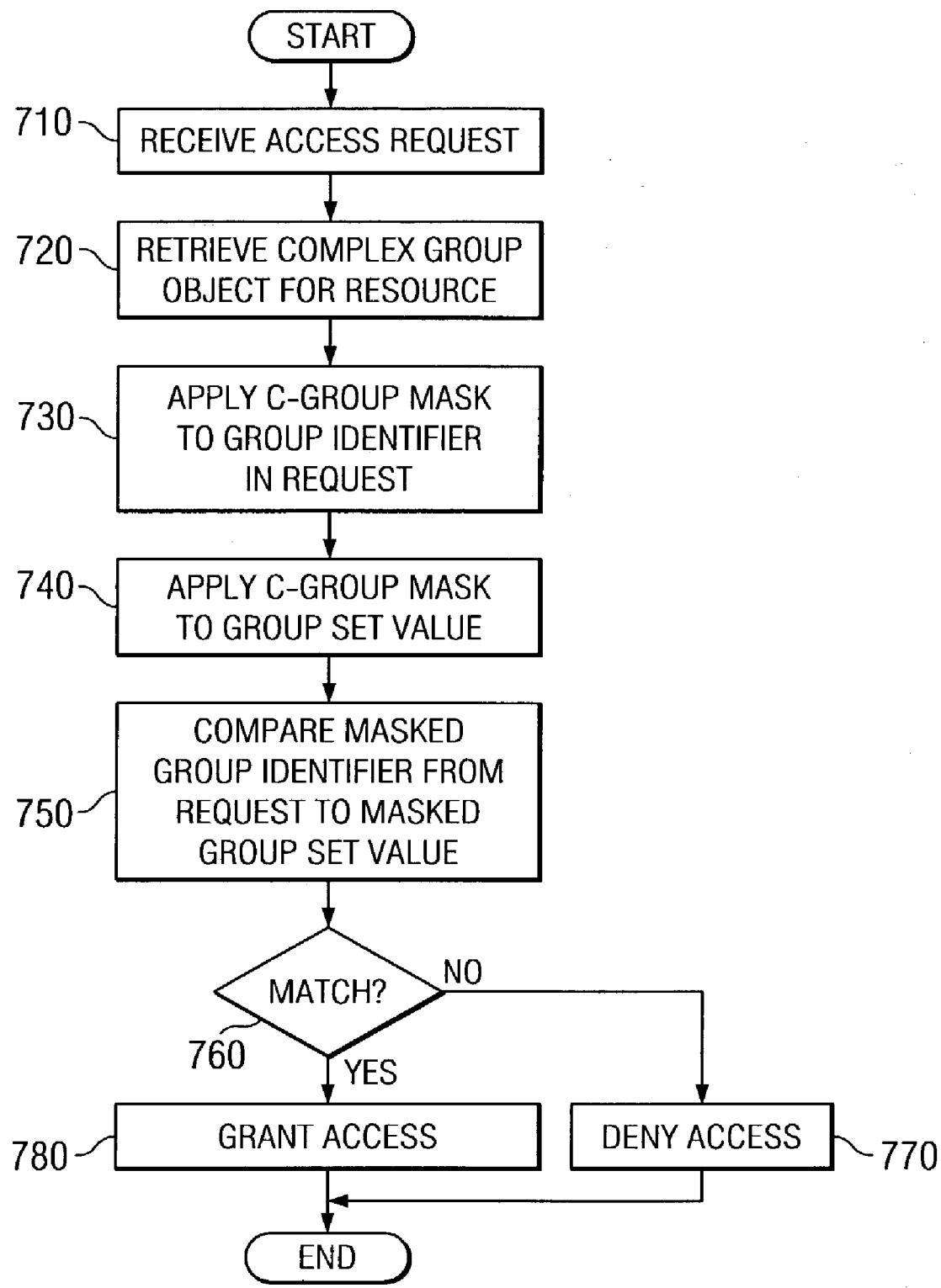
FIG. 7 is a flowchart outlining an exemplary operation of one embodiment of the present invention.

FIG. 7 is a flowchart outlining an exemplary operation of one embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts by receiving an access request having a group identifier associated with the requester and identifying a resource to which access is desired (step 710). A complex group object associated with the resource is then retrieved (step 720). As previously described, this complex group object includes a group set value and a mask value.

The complex group mask value is then applied to the group identifier of the requester, i.e. the group identifier received in the access request (step 730). As previously described, the application of the mask value to the group identifier may include bitwise ANDing the mask value with the group identifier to obtain a masked group identifier of the requester, for example.

The complex group mask value is also applied to the group set value in the complex group (step 740). Again, this may involve bitwise ANDing the complex group mask value with the group set value to obtain a masked group set value. It should be noted that step 740 may be performed when the complex group data object is created as the result of this step has a constant value.

The resulting masked group set value and the masked group identifier of the requestor are compared (step 750) and a determination is made as to whether they match (step 760). If not, access to the resource is denied (step 770). If they do match, then access is granted (step 780). The authorization process then ends.

Thus, the present invention provides a system and method for representing a plurality of groups of users/resources as a single group data object. With the present invention the same group set value may be used to represent a plurality of different groups. Resources may be provided with different mask values in order to identify which groups in the group set value are authorized to access the associated resource. As a result, a plurality of resources may be provided with complex group objects that all have the same group set value but may have different mask values for their specific purposes.

With the present invention, the amount of processing necessary to authorize access to a given resource remains the same regardless of the number of groups. Additional groups may be added by increasing the number of bits in the group set value and mask value. However, the authorization process will always consist of the two step process of masking the received group identifier and comparing the masked group identifier to the group set value of the complex group object for the resource. In other words, the size of the "group" structure maintained by the computing system does not appreciably affect the performance of the authorization process of the present invention.

As mentioned above, the present invention is especially useful for implementing access control lists for distributed computing system resources. In addition, the present invention may be used with other access control mechanisms without departing from the spirit and scope of the present invention. In short, any control mechanism in which the membership required for access to an associated entity may be represented by a group set value and a mask value may make use of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of authenticating an access request in a data processing system, comprising:
    receiving the access request, wherein the access request includes a group identifier and designates a resource to which access is requested;
    retrieving a complex group data object associated with the resource, wherein the complex group data object includes a group set value representing a plurality of requestor groups and a mask value, wherein the mask value masks out bits in the group identifier; and
    authenticating the access request based on the group identifier, group set value, and mask value, wherein authenticating the request based on the group identifier, group set value, and mask value includes:
    applying the mask value to the group identifier to generate a masked group identifier; and
    comparing the mask group identifier to the group set value;
    wherein comparing the masked group identifier to the group set value includes:
        applying the mask value to the group set value to generate a masked group set value; and comparing the masked group identifier to the masked group set value;
        if the masked group identifier matches the masked group set value, then the access request is authorized;
        if the masked group identifier does not match the masked group set value, then the access request is denied.

2. The method of claim 1, wherein applying the mask value to the group identifier includes bitwise ANDing the mask value with the group identifier.

3. The method of claim 1, wherein applying the mask value to the group set value includes bitwise ANDing the mask value with the group set value.

4. The method of claim 1, wherein the mask value is one of a hierarchical group membership mask value, a group category membership mask value, and a hybrid mask value.

* * * * *